(No Model.)

M. SULLIVAN.
STOVE.

No. 582,767.  Patented May 18, 1897.

Witnesses
O. C. Wing.
M. G. MacLean.

Inventor
Mary Sullivan
By Carr & Deemer Co.
Attorneys

THE NORRIS PETERS CO., PHOTO-LITHO., WASHINGTON, D. C.

UNITED STATES PATENT OFFICE.

MARY SULLIVAN, OF BAY CITY, MICHIGAN.

STOVE.

SPECIFICATION forming part of Letters Patent No. 582,767, dated May 18, 1897.

Application filed May 27, 1896. Serial No. 593,216. (No model.)

*To all whom it may concern:*

Be it known that I, MARY SULLIVAN, a citizen of the United States, and a resident of Bay City, county of Bay, and State of Michigan, have invented certain new and useful Improvements in Stoves, of which the following is a specification, reference being had to the accompanying drawings, forming a part thereof, in which similar letters of reference indicate corresponding parts.

This invention relates to a new and useful improvement in stoves especially adapted for use in laundries for heating sad-irons; and it is so constructed as to permit the heating of many such irons at the same time, and which will utilize nearly all the heat generated for the above-named purpose instead of permitting its radiation, thus saving fuel and preventing the unnecessary heating of the room in which it is used.

The invention will be hereinafter fully described, and specifically set forth in the annexed claim.

Figure 1:
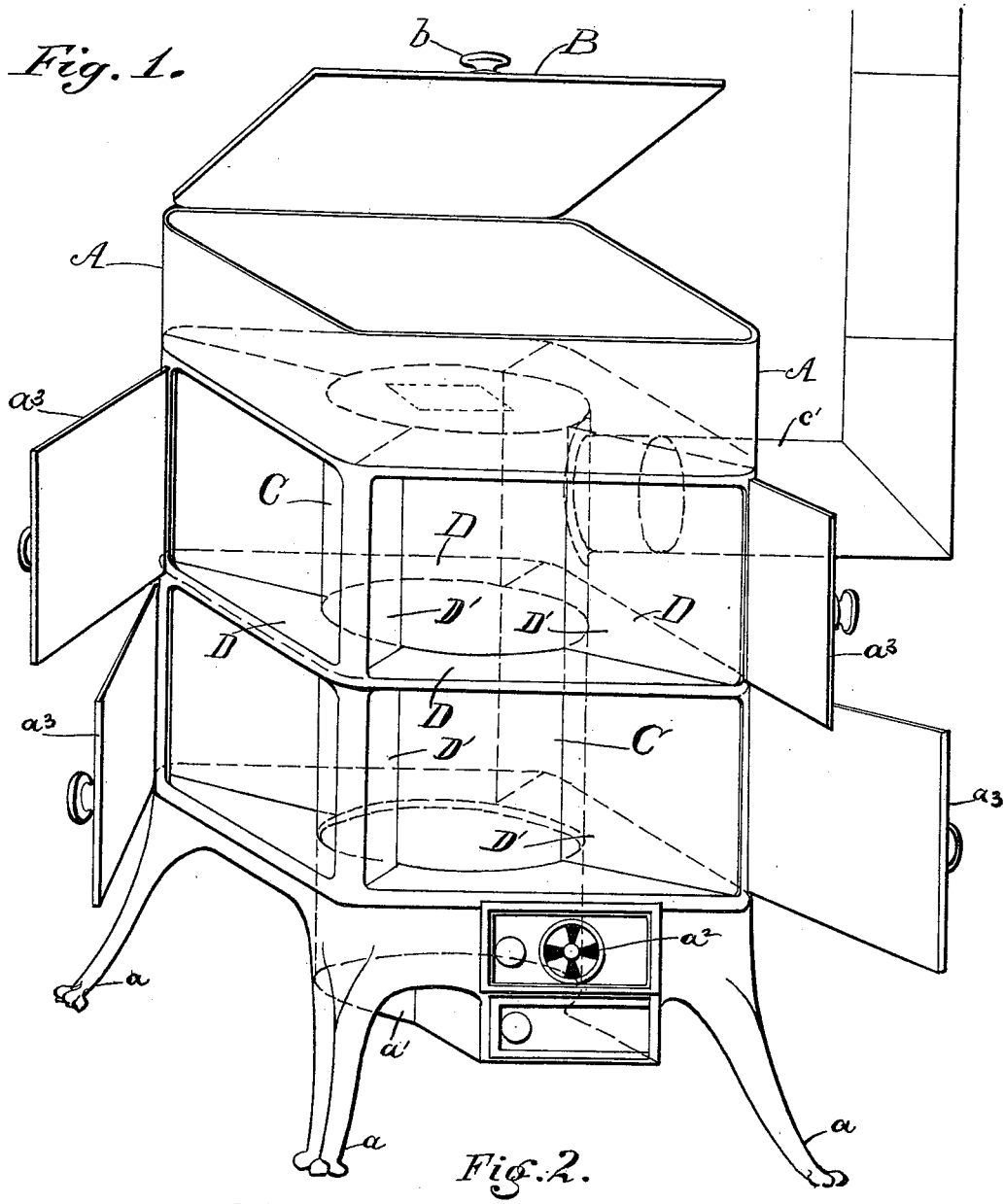
Figure 2:
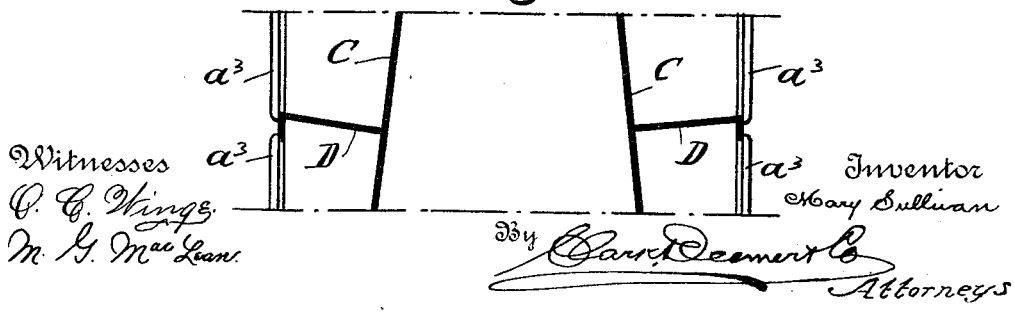

In the accompanying drawings, forming part of this specification, Figure 1 is a perspective view of my improved stove; and Fig. 2, a vertical sectional elevation of a portion of a stove, showing a slightly-modified form.

In the practice of my invention I provide an outer metal casing A, preferably square and mounted on feet $a$, like ordinary cook-stoves, and having provided in the bottom portion an ash-pit $a'$ and ventilating-flue $a^2$ and the ordinary grate-bars for supporting the fuel. The outer casing A is provided on each of its four sides, when square, with one or a series of doors $a^3$, hinged so as to open radially or otherwise, if preferred, also having a hinged top cover or lid B, provided on its edge with a lifting-button $b'$.

The inner compartment consists of a vertical cylinder or fire-box C, having its center equidistant from each of the four sides of casing A and its lower end opening into the ash-pit $a'$ and ventilating-flue $a^2$. The said cylinder C is at its top furnished with an aperture and lid, by means of which fuel can be introduced, and is also near its upper end furnished with an aperture fitted with a collar leading into a section of ordinary stove-pipe $c'$, which is also led through a suitable aperture in the outer casing A and thence continued as ordinarily.

The stove may be made of any desirable height; but for the purpose of more securely confining the heat and to provide resting-places for the irons to be heated there are annular partitions D provided, which extend from the inner wall of the outer casing A to cylinder C and fit snugly around the latter. If found preferable, each of these compartments may be laterally divided into others by vertical partitions $D'$, so that the compartment into which each door $a^2$ opens will be entirely separate from the others. It is also preferable to incline the annular partition D downwardly, as illustrated in Fig. 2. In this case the cylinder C should be of a conical contour.

The top surface of the cylinder or fire-box C is flush with the upper surface of the final or highest partition D, thus forming between it and lid B a hot-air chamber of considerable area, which may be used for heating irons or any other utensils or articles in a laundry or kitchen.

It is obvious that the scope of my invention will permit much modification of the device both in form and construction. For instance, the outer casing A may, if preferred, be of conical or cylindrical form, and instead of separate doors for each compartment a door of sufficient vertical height to cover the entire side could be used.

The stove can also be made of any suitable metal, although it is preferable to make the cylinder C of rough casting, so as to obtain the utmost radiation, and the outer casing of japanned sheet-iron, so as to prevent further radiation as far as possible.

Having thus described my invention, what I claim as new, and desire to secure by Letters Patent, is—

In a sad-iron heater consisting of a fire-box, a casing surrounding said fire-box, a plurality of vertical partitions and a plurality of longitudinal partitions dividing the space between the casing and the fire-box into compartments; the said longitudinal partitions inclined downardly, and an auxiliary heating-compartment provided between the top partition and the cover of said casing adapted for heating other articles than sad-irons therein, substantially as shown and described.

In testimony that I claim the foregoing as my invention I have signed my name, in presence of two witnesses, this 21st day of May, 1896.

MARY SULLIVAN.

Witnesses:
J. ELZÉAR LE ROUX,
AZILDA LE ROUX.